US011530919B1

(12) United States Patent
Myers

(10) Patent No.: US 11,530,919 B1
(45) Date of Patent: Dec. 20, 2022

(54) METHODS FOR NAVIGATING AIDED BY ARTIFICIAL STARS AND DEVICES THEREOF

(71) Applicant: OROLIA DEFENSE & SECURITY LLC, Rochester, NY (US)

(72) Inventor: Paul Edward Myers, Pittsford, NY (US)

(73) Assignee: OROLIA DEFENSE & SECURITY LLC, Rochester, NY (US)

( * ) Notice: Subject to any disclaimer, the term of this patent is extended or adjusted under 35 U.S.C. 154(b) by 0 days.

(21) Appl. No.: 17/591,787

(22) Filed: Feb. 3, 2022

(51) Int. Cl.
*B60T 7/12* (2006.01)
*G01C 21/02* (2006.01)
*G06V 20/56* (2022.01)

(52) U.S. Cl.
CPC ........... *G01C 21/025* (2013.01); *G06V 20/56* (2022.01)

(58) Field of Classification Search
CPC ...... G01C 21/00; G01C 21/005; G01C 21/02; G01C 21/025
See application file for complete search history.

(56) References Cited

U.S. PATENT DOCUMENTS

| | | | | |
|---|---|---|---|---|
| 2015/0042793 | A1* | 2/2015 | Belenkii | G01C 21/025 348/143 |
| 2016/0320491 | A1* | 11/2016 | Perdue | G01S 19/05 |
| 2019/0043211 | A1* | 2/2019 | Bertrand | G01C 25/00 |

OTHER PUBLICATIONS

Johannes Gutenberg-Universität Mainz, "Earth's magnetic field measured using artificial stars at 90 kilometers altitude", Physics Org, Nov. 14, 2018.
Zhai, Chengxing, et al., "Nanoradian ground-based astrometry, optical navigation, and artificial reference stars," Proceedings vol. 9908, Ground-based and Airborne Instrumentation for Astronomy VI; 99085B (2016) https://doi.org/10.1117/12.2233689, SPIE Astronomical Telescopes + Instrumentation 2016, Edinburgh, Scotland, Jun. 26-Jul. 1, 2016.
Hecht, Jeff, "Laser guide stars in space," LaserFocusWorld, Jan. 16, 2019.
Max, C.E., "Image Improvement from a Sodium-Layer Laser Guide Star Adaptive Optics System," U.S. Department of Energy by the Lawrence Livermore National Laboratory, Jun. 1997.

* cited by examiner

*Primary Examiner* — John Kwon
(74) *Attorney, Agent, or Firm* — Troutman Pepper Hamilton Sanders LLP

(57) ABSTRACT

This technology includes methods, non-transitory computer readable media, and pattern navigation aiding devices that obtain one or more images of a section of sky. Stars comprising at least one or more artificial stars in the one or more obtained images of the section of the sky that are in an image pattern that match above a set threshold at least one previously shared beacon pattern are identified. Navigational information from the identified image pattern with the at least one or more artificial stars that matches above the set threshold the at least one previously shared beacon pattern is determined and output to provide navigational assistance.

18 Claims, 6 Drawing Sheets

METHODS FOR NAVIGATING AIDED BY ARTIFICIAL STARS AND DEVICES THEREOF

FIELD

This technology provides methods and systems for navigating aided by artificial stars.

BACKGROUND

Celestial navigation is practice of position fixing using celestial bodies in the sky that enables a navigator to accurately determine a current physical location. Celestial navigation uses timed angular measurements typically taken between a celestial body, such as the sun, moon, or a star, and the visible horizon. Although this well-known method of navigation is effective, this historic celestial navigation practice lacks the ability to quickly and effectively provide other types of navigational information, such as a current direction or a location of true north.

SUMMARY

A navigation aid method includes obtaining, by a computing device, one or more images of a section of sky. Stars comprising at least one or more artificial stars in the one or more obtained images of the section of the sky that are in an image pattern that match above a set threshold at least one previously shared beacon pattern are identified, by the computing device. Navigational information from the identified image pattern with the at least one or more artificial stars that matches above the set threshold the at least one previously shared beacon pattern is determined, by the computing device, and output to provide navigational assistance.

A pattern navigation aiding device, comprising memory comprising programmed instructions stored thereon and one or more processors configured to be capable of executing the stored programmed instructions to obtain one or more images of a section of sky. Stars comprising at least one or more artificial stars in the one or more obtained images of the section of the sky that are in an image pattern that match above a set threshold at least one previously shared beacon pattern are identified. Navigational information from the identified image pattern with the at least one or more artificial stars that matches above the set threshold the at least one previously shared beacon pattern is determined and output to provide navigational assistance.

A non-transitory computer readable medium having stored thereon instructions comprising executable code which when executed by one or more processors, causes the one or more processors to obtain one or more images of a section of sky. Stars comprising at least one or more artificial stars in the one or more obtained images of the section of the sky that are in an image pattern that match above a set threshold at least one previously shared beacon pattern are identified. Navigational information from the identified image pattern with the at least one or more artificial stars that matches above the set threshold the at least one previously shared beacon pattern is determined and output to provide navigational assistance.

This technology provides a number of advantages including providing methods and systems for more dynamic navigational assistance with beacon patterns which have one or more artificial stars. Examples of this technology are able to provide additional navigation assistance to ground, sea, or air based vehicles then was previously possible with celestial navigation. Additionally, examples of this technology are able to compensate for atmospheric conditions which interference with traditional celestial navigation. Further, examples of this technology are able to provide navigational assistance information that aids an inertial navigation system in determining a heading and position when, for example, GPS/GNSS signal is denied or disrupted or in defining a confidence level of a determined position and/or heading by way of example.

DETAILED DESCRIPTION

Figure 1:
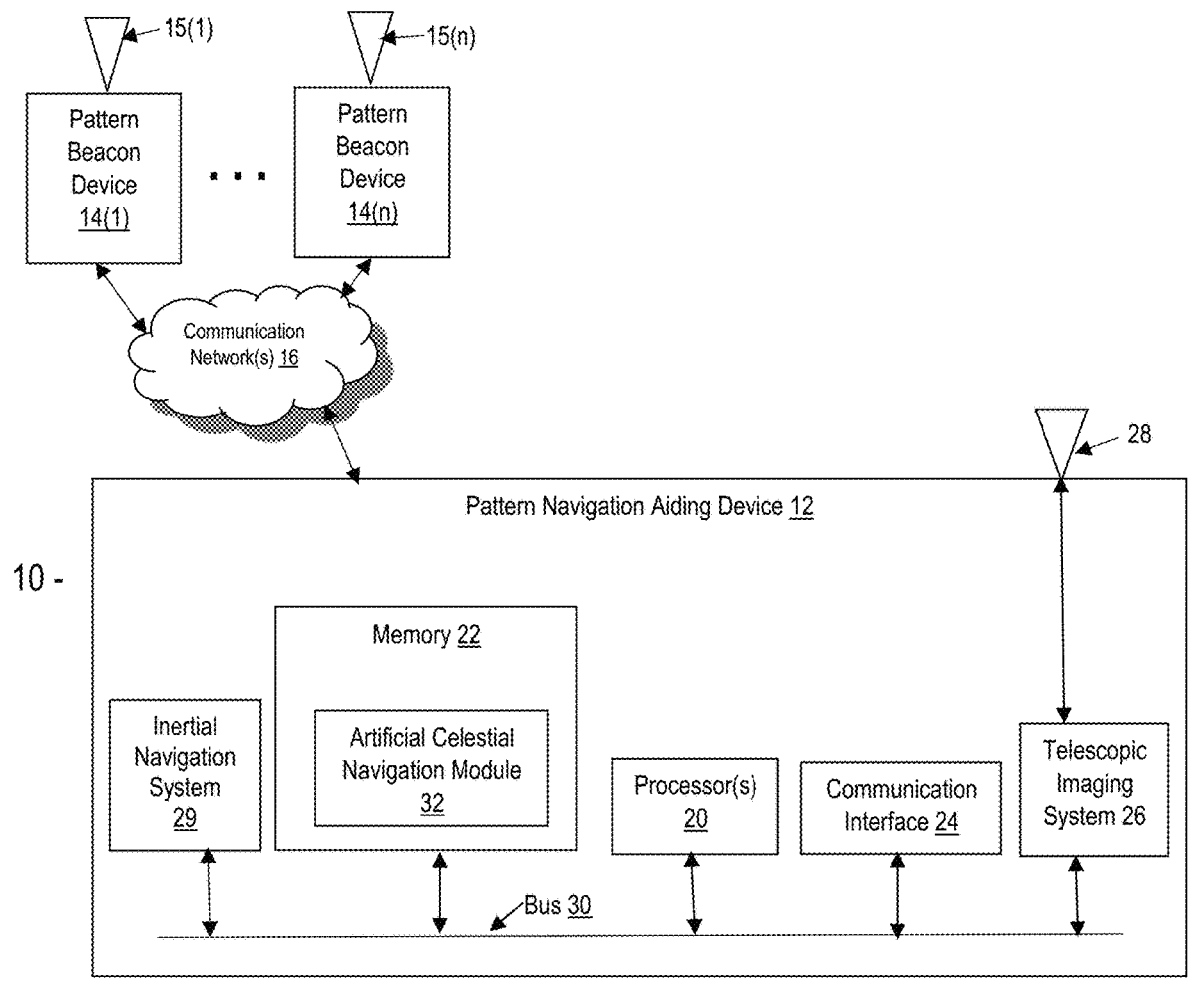
FIG. 1 is a block diagram of an environment with an exemplary navigation aiding system with a pattern navigation aiding device and a plurality of exemplary pattern beacon devices.

An environment with an exemplary navigation aiding system 10 is illustrated in FIG. 1. In this example, the navigation aiding system 10 includes a pattern navigation aiding device (PNAD) 12, a plurality of exemplary pattern beacon devices 14(1)-14(n), and a communication network 16, although the system may have other types and/or numbers of other systems, devices, components, and/or other elements in other configurations. In other examples, there may be more or fewer of the pattern navigation aiding device 12 and/or the pattern beacon devices 14(1)-14(n) in the navigation aiding system 10 than illustrated in FIG. 1. This technology provides a number of advantages including providing methods and systems for more dynamic navigational assistance with beacon patterns which have one or more artificial stars.

The pattern navigation aiding device 12 is configured to search the sky for one or more beacon patterns comprising one or more artificial stars to enable navigation, although the device can perform other types and/or numbers of operations as illustrated and described by way of the examples herein. By way of example, the pattern navigation aiding device 12 can be configured to detect beacon patterns comprising artificial constellations made only of artificial stars or beacon patterns made of overlaying generated patterns of artificial stars with naturally occurring bright stars in the night sky. In examples illustrated and described herein, beacon patterns made only of artificial stars are called artificial beacon patterns while beacon patterns containing artificial and real stars are called hybrid beacon patterns.

In this example, the pattern navigation aiding device 12 includes a processor 20, memory 22, communication interface 24, a telescopic imaging system 26, and an optional inertial navigation system 29 which are coupled together by a bus 30 or other communication link, although the system may have other types and/or numbers of other systems, devices, components, and/or other elements in other configurations, such as the optional inertial navigation system 29 being located in another system, such as another vehicle, and communicatively coupled to the pattern aiding navigation device 12.

The processor 20 may execute programmed instructions stored in the memory 22 including by way of example programmed instructions for navigating more effectively with beacon patterns with one or more artificial stars as illustrated and described by way of the examples herein, although the processor may execute other types and/or numbers of other programmed instructions to implement examples of the claimed technology. The processor 20 may include one or more CPUs or general purpose processors with one or more processing cores, for example, although other types of processor(s) can also be used.

The memory 22 stores these programmed instructions for one or more aspects of the present technology as described and illustrated by way of the examples herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Accordingly, the memory 22 can store one or more applications that can include computer executable instructions that, when executed by the pattern navigation aiding device 12, cause the pattern navigation aiding device 12 to perform actions, such as to navigate more effectively with beacon patterns with one or more artificial stars described and illustrated below with reference to the examples shown and described with reference to FIGS. 2-6. The application(s) can be implemented as modules or components of other applications. Further, the application(s) can be implemented as operating system extensions, module, plugins, or the like.

The memory 22 includes an artificial celestial navigation module 32, although the memory can include other types and/or numbers of other policies, modules, databases, or applications. The artificial celestial navigation module 32 is configured to use celestial navigation methods and image processing using angle compensation and rotation of celestial view to aid in the recognition of one or more beacon patterns, although the artificial celestial navigation module may execute other types and/or numbers of other functions and operations. In this particular example the artificial celestial navigation module 32 finds the one or more beacon patterns and, once identified, the orientation and location of the one or more beacon patterns in the sky assists in improving position and heading using programmed celestial navigation methods. The artificial celestial navigation module 32 also may be configured to retrieve or otherwise obtain information on where in a sky the one or more beacon patterns will be displayed and their orientation which can aid with navigation and also assist in other determinations, such as direction and location of true north by way of example.

The communication interface 24 operatively couples and manages communication for the pattern navigation aiding device 12 with the pattern beacon devices 14(1)-14(n), which are all coupled together by the communication network(s) 16, although other types and/or numbers of communication networks or systems with other types and/or numbers of connections and/or configurations to other devices and/or elements can also be used.

A telescope 28 uses telescopic magnification to scan the sky for the presence of artificial stars arranged in artificial or hybrid real and artificial constellations which can be used to aid navigation, although the device can perform other types and/or numbers of operations.

The inertial navigation system 29 is a navigation device that includes a navigation computing device, motion sensors, and rotation sensors which are programmed and configured to calculate a position, orientation, and velocity of a moving object, although the system can perform other types and/or numbers of other types of operations. In this example, the inertial navigation system 29 is located in the pattern navigation aiding device 12, although the system 29 could be in other locations where it is communicatively coupled to the pattern navigation aiding device 12.

The pattern beacon devices 14(1)-14(n) are used to create one or more beacon patterns with one or more artificial stars in the sky, although these devices can perform other types and/or numbers of other functions and operations. In this example, the artificial stars are generated in the mesosphere in the altitude range of 85 to about 100 kilometers by laser systems 15(1)-15(n) in the pattern beacon devices 14(1)-14(n). The atmosphere at this layer contains sodium atoms which are excited by the laser beams and create what astronomers refer to as laser guide stars.

The pattern beacon devices 14(1)-14(n) may, for example, be deployed in a region in which navigational assistance is required due to loss of or other difficulties with GPS/GNSS and other methods of navigation. Additionally, pattern beacon devices 14(1)-14(n) may, for example, be based on the ground, in the air, or in space to generate beacon patterns in the atmosphere. In particular, ground based pattern beacon devices are pattern beacon devices 14(1)-14(n) located on the ground and use lasers to excite sodium atoms in the atmosphere to create laser guide stars from the ground. Air based pattern beacon devices are pattern beacon devices 14(1)-14(n) mounted on aircraft and use lasers to excite sodium atoms in the atmosphere to create laser guide stars from the aircraft. Space based pattern beacon devices are pattern beacon devices 14(1)-14(n) mounted on satellites which use lasers to excite sodium atoms in the atmosphere to create laser guide stars from space.

Each of the pattern beacon devices 14(1)-14(n) in this example may include one or more processors, a memory, and a communication interface, which are coupled together by a bus or other communication link, although other types of systems, devices, components, and/or other elements could be used. Additionally, in this example each of the pattern beacon devices 14(1)-14(n) includes multiple high-powered lasers in laser systems 15(1)-15(n) which create laser guide stars for the beacon patterns. Each of the lasers in laser systems 15(1)-15(n) pumps energy into the sodium atoms which create the artificial stars created by the glowing sodium atoms. These artificial stars are typically observed using telescopes as they are very faint. Because the glowing atmosphere emits photons in all directions, these laser guide stars can be observed under magnification from all directions.

The communication network(s) 16 may, for example, couple the pattern navigation aiding device 12 with the pattern beacon devices 14(1)-14(n). The communication network(s) 16 can include wireless and/or direct connection which may include local area network(s) (LAN(s)) or wide area network(s) (WAN(s), although other types and/or numbers of communication networks which operate with one or more protocols can be used.

Although the exemplary system 10 with the pattern navigation aiding device 12, pattern beacon devices 14(1)-14(n), and communication network(s) 16 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 2:
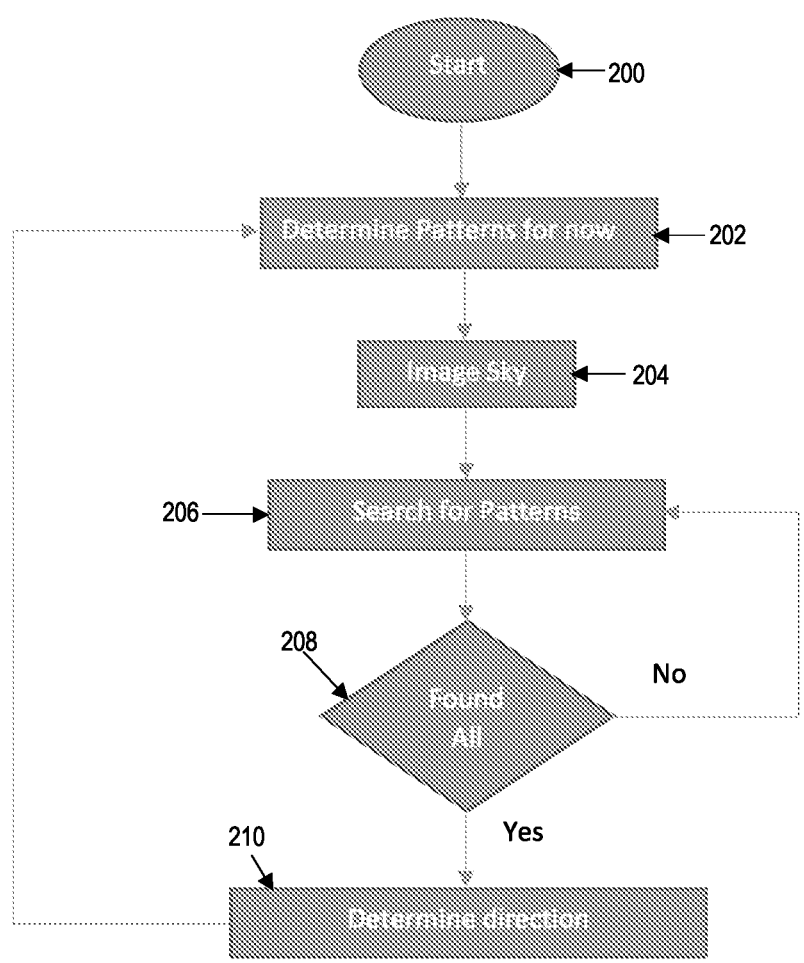
FIG. 2 is a flowchart of an exemplary method for providing dynamic navigational assistance aided by beacon patterns with one or more artificial stars.

An exemplary method for method for providing dynamic navigational assistance aided by beacon patterns with one or more artificial stars will now be described with reference to FIGS. 1-2 and 4-6. Referring more specifically to FIG. 2, in this example which begin is step 200 the pattern navigation aiding device 12 starts this process. As described earlier, the pattern beacon devices 14(1)-14(n) may, for example, be deployed in a region where the pattern navigation aiding device 12 is located and in which dynamic navigational assistance may be required, for example due to loss of or other difficulties with GPS/GNSS and other methods of navigation. The pattern beacon devices 14(1)-14(n) may, for example, be based on the ground, in the air, or in space and are used to create one or more beacon patterns with one or more artificial stars in the sky, although these devices can perform other types and/or numbers of other functions and operations. In this example, the artificial stars are generated in the mesosphere in the altitude range of 85 to about 100 kilometers by laser systems 15(1)-15(n) in the pattern beacon devices 14(1)-14(n). The atmosphere at this layer contains sodium atoms which are excited by the laser beams and create what astronomers refer to as laser guide stars. In these examples, the artificial stars are laser guided stars which are limited to the night sky because they would not be visible in the daylight sky because they are created by exciting sodium atoms which radiate visible light at 589.0 nm wavelength. However, in other examples the laser guide stars could be created and imaged by the pattern navigation aiding device 12 either in visible spectrum or in infrared spectrum during the day or the ionizing effects in the atmosphere could be detected and location measured so that daylight navigation aiding could be accomplished.

In step 202, the pattern navigation aiding device 12 retrieves from memory or otherwise obtain the one or more beacon patterns that need to be identified. By way of example only, the pattern navigation aiding device 12 may obtain the one or more beacon patterns that need to be identified from one or more of the pattern beacon devices 14(1)-14(n) and/or from other systems or devices involved in this process. Additionally, the pattern navigation aiding device 12 may optionally obtain other data on where to expect one or more beacon patterns that need to be identified for that current date, time and/or location, although other types of information to assist with locating the beacon patterns can be used.

In step 204, the pattern navigation aiding device 12 uses the telescopic imaging system 26 with the telescope 28 to capture one or more images of a night sky, although other manners for capturing or otherwise obtaining celestial views may be used. In this example, the pattern navigation aiding device 12 also may also utilize the obtained data on where to expect the one or more beacon patterns that need to be identified for that current date, time and/or location to assist with positioning the telescope 28 to capture or otherwise obtain images of the night sky with the telescopic imaging system 26.

In step 206, the pattern navigation aiding device 12 executes image processing in the artificial celestial navigation module 32 to analyze the one or more captured images of the sky to search for the one or more beacon patterns that need to be identified, although other manners for searching for the beacon patterns may be used. The one or more beacon patterns that need to be identified may comprise only artificial stars generated by one or more of the pattern beacon devices 14(1)-14(n) as shown by way of example in FIG. 4 or may comprise a hybrid combination of one or more artificial stars and one or more real stars as shown by way of example in FIG. 5.

In this particular example for the image processing, the pattern navigation aiding device 12 executes a pattern matching algorithm in the artificial celestial navigation module 32 which uses pattern matching and a correlation filter to identify patterns of artificial and/or real stars in each of the captured images that match above a set threshold the previously shared beacon patterns that need to be identified from step 202. To assist with the search and identification, the pattern navigation aiding device 12 may rotate one or more of the captured images and/or take into account and adjust an angle of view. In other examples, to assist with the search and identification, the pattern navigation aiding device 12 may first identify a real star or stars that are in a hybrid beacon pattern to facilitate the identification process and then may identify the artificial stars based on the identification of the real star or stars.

In step 208, the pattern navigation aiding device 12 determines when all of the stored or otherwise obtained one or more beacon patterns that need to be identified have been located in the one or more of the captured images of the sky. If in step 208 the pattern navigation aiding device 12 determines all of the stored or otherwise obtained one or more beacon patterns that need to be identified have not been located in the one or more captured images of the sky, then the No branch is taken back to step 206 as described earlier. In other examples, the pattern navigation aiding device 12 could also return to step 204 to capture one or more additional images of the sky.

If back in step 208 the pattern navigation aiding device 12 determines all of the stored or otherwise obtained one or more beacon patterns that need to be identified have been located in the one or more captured images of the sky, then the Yes branch is taken to step 210. In step 210, the pattern navigation aiding device 12 determines a direction from the location of the one or more beacon patterns in the one or more captured images of the sky, although other types of directional and/or other navigational information may be determined, such as a direction for true north by way of example.

Figure 6:
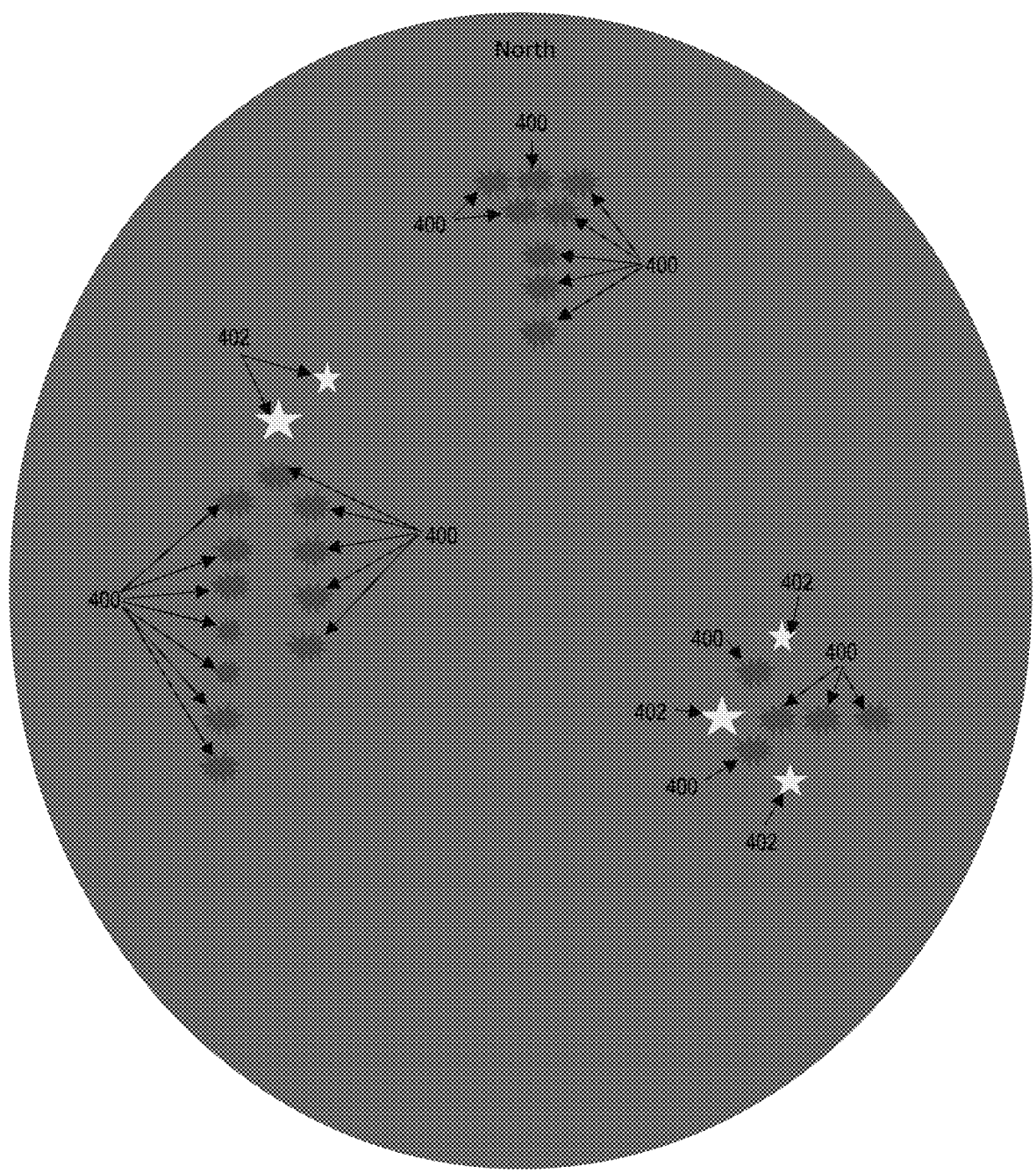
FIG. 6 is an exemplary view of a sky with examples of an artificial star beacon pattern and two hybrid real and artificial star beacon patterns.

In this particular example for the determining the direction, the pattern navigation aiding device 12 executes a direction algorithm in the artificial celestial navigation module 32 which uses line fitting techniques to create a line through the artificial stars and/or real stars, although other approaches may be used. One example, of this line fitting is illustrated by line A-A in FIG. 4 through artificial stars 400 in an example of an artificial beacon pattern and another is illustrated by line B-B in FIG. 5 through artificial stars 400 and a real star 402 of a hybrid beacon pattern. Next, the pattern navigation aiding device 12 may use pattern matching or other approaches to identify a head and tail of an image, although other approaches may be used. By way of example, the pattern navigation aiding device 12 may identify the head of an arrow shown by the artificial stars 400 and real stars 402 on the left side and the tail shown by the artificial stars 400 on the right of the hybrid beacon pattern shown in FIG. 5. The determined line, such as A-A or B-B alone or in conjunction with the shape or configuration of the stars in the beacon patterns can provide directional information. By way of another example, the pattern navigation aiding device 12 may identify direction with the artificial stars 400 in the artificial star beacon pattern shown in FIG. 4. Other examples of artificial star beacon patterns and hybrid beacon patterns which could be identified are illustrated in FIG. 6.

The pattern navigation aiding device 12 may also identify and analyze multiple beacon patterns in the captured images and then take an average or other combined adjustment to determine and further refine direction or other navigational assistance information.

The pattern navigation aiding device 12 can output this directional and other navigation assistance information, for example, to a display visible to a driver in a vehicle with the pattern navigation aiding device 12, although this output can be provided or used in other manners. By way of example, this output comprising a derived position and heading could be used to input to the inertial navigation system 29 as aiding data to assist in determination of heading and position when, for example, GPS/GNSS signal is denied or disrupted. The use of this output can advantageously improve the solution of the inertial navigation system 29 or provide other assistance, such as assisting in defining a confidence level of a determined position and/or heading by way of example. If for example navigation of a vehicle with the pattern navigation aiding device 12 continues to require navigational assistance, then this method can return to step 202 as described earlier.

Figure 3:
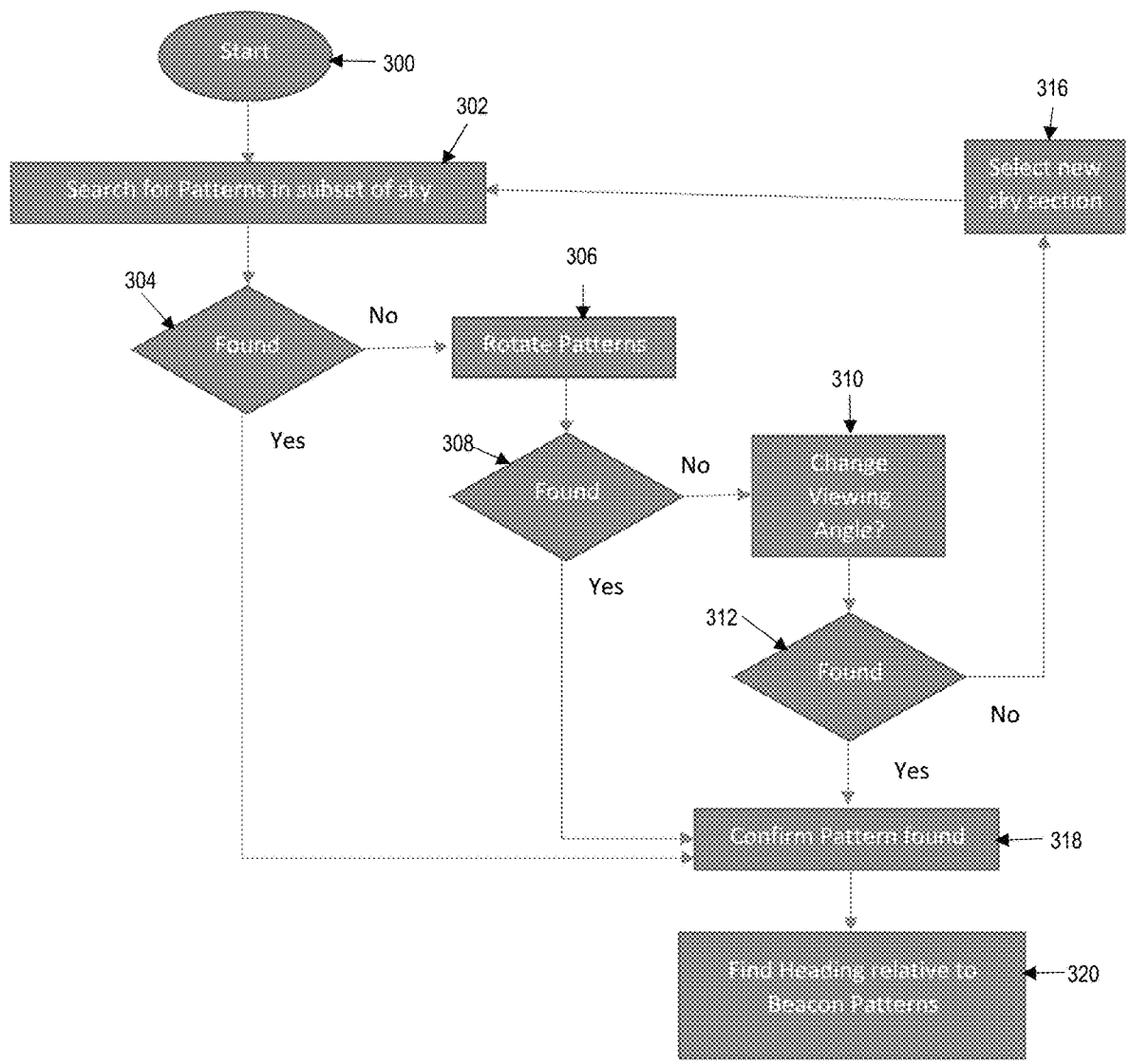
FIG. 3 is a flowchart of another exemplary method for providing dynamic navigational assistance aided by beacon patterns with one or more artificial stars.
Figure 4:
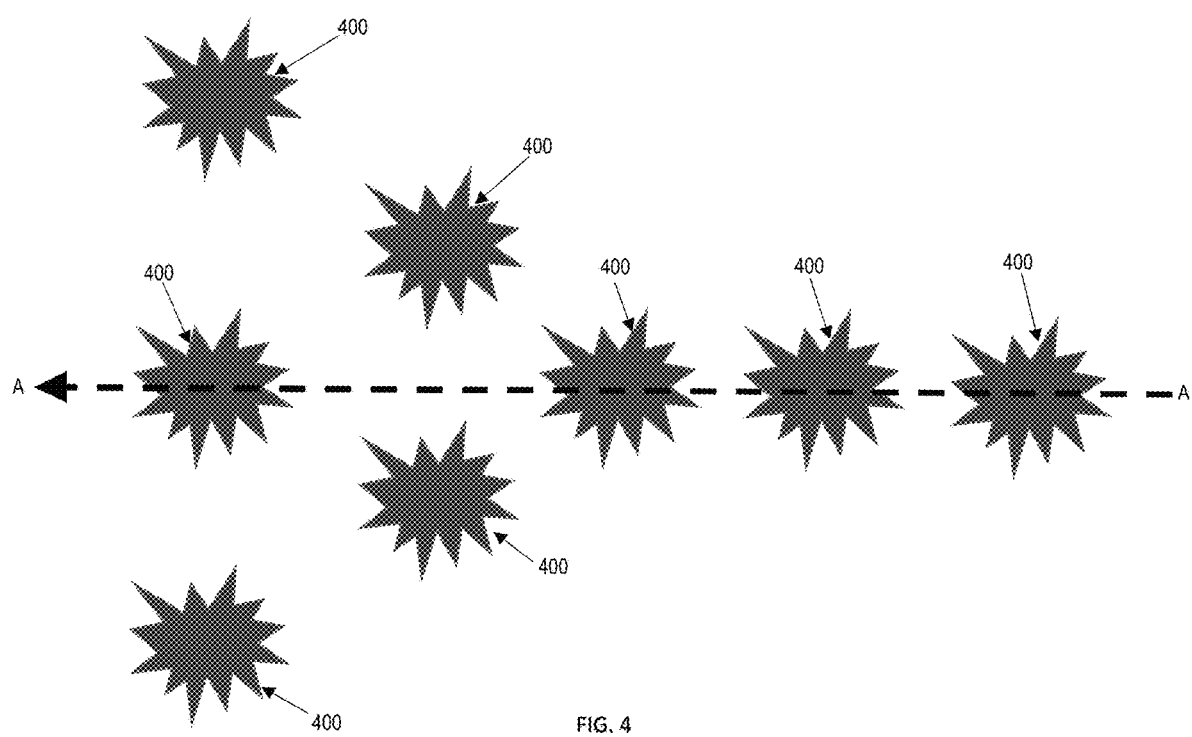
FIG. 4 is a diagram of an example of an artificial star beacon pattern.
Figure 5:
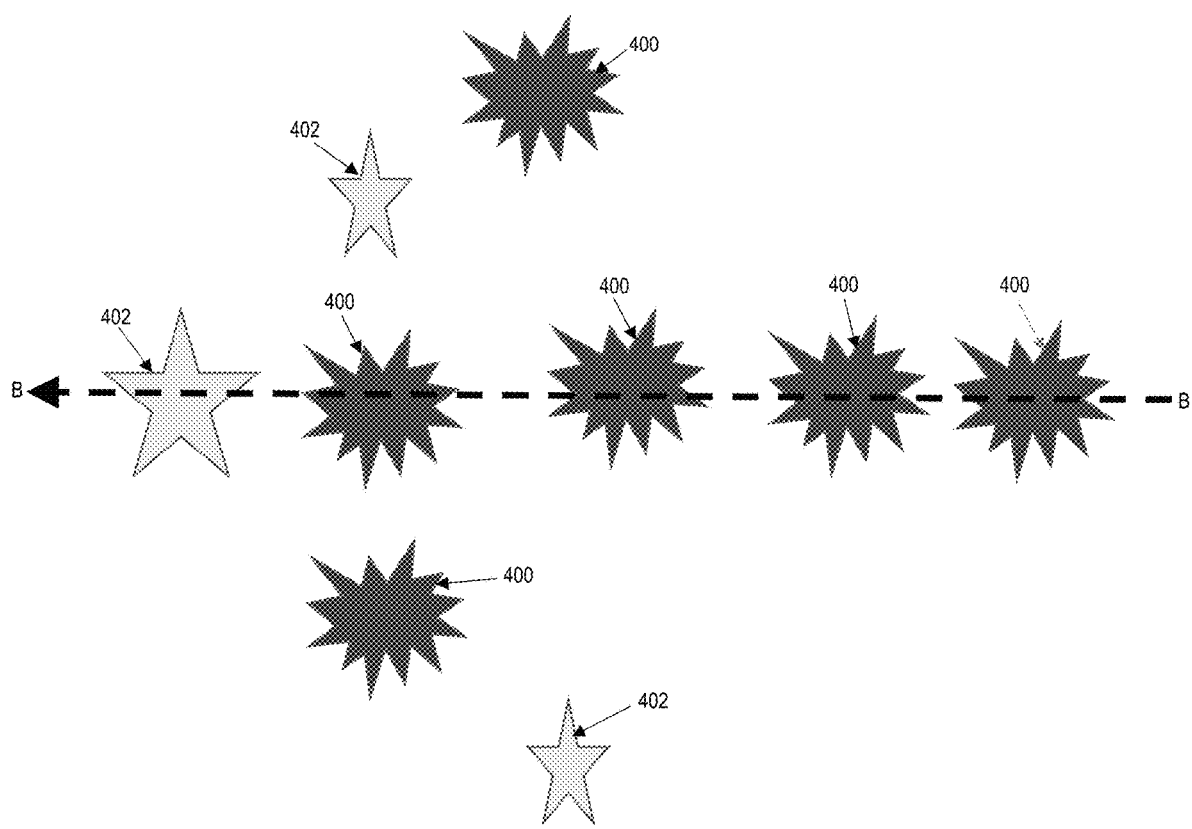
FIG. 5 is diagram of an example of a hybrid real and artificial star beacon patterns.

Another exemplary method for method for providing dynamic navigational assistance aided by beacon patterns with one or more artificial stars will now be described with reference to FIGS. 1 and 3-6. Referring more specifically to FIG. 3, in this example which begin is step 300 the pattern navigation aiding device 12 starts this process. As described earlier, the pattern beacon devices 14(1)-14(n) may again, for example, be deployed in a region where the pattern navigation aiding device 12 is located and in which dynamic navigational assistance may be required, for example due to loss of or other difficulties with GPS/GNSS and other methods of navigation. The pattern beacon devices 14(1)-14(n) may, for example, be based on the ground, in the air, or in space and are used to create one or more beacon patterns with one or more artificial stars in the sky, although these devices can perform other types and/or numbers of other functions and operations. In this example, the artificial stars are generated in the mesosphere in the altitude range of 85 to about 100 kilometers by laser systems 15(1)-15(n) in the pattern beacon devices 14(1)-14(n). The atmosphere at this layer contains sodium atoms which are excited by the laser beams and create what astronomers refer to as laser guide stars. In these examples, the artificial stars are laser guided stars which are limited to the night sky because they would not be visible in the daylight sky because they are created by exciting sodium atoms which radiate visible light at 589.0 nm wavelength. However, in other examples the laser guide stars could be created and imaged by the pattern navigation aiding device 12 either in visible spectrum or in infrared spectrum during the day or the ionizing effects in the atmosphere could be detected and location measured so that daylight navigation aiding could be accomplished.

In step 302, the pattern navigation aiding device 12 again retrieves from memory or otherwise obtains the one or more beacon patterns that need to be identified. By way of example only, the pattern navigation aiding device 12 may obtain the one or more beacon patterns that need to be identified from one or more of the pattern beacon devices 14(1)-14(n) and/or from other systems or devices involved in this process. Additionally, the pattern navigation aiding device 12 may optionally obtain other data on where to expect one or more beacon patterns that need to be identified for that current date, time and/or location, although other types of information to assist with locating the beacon patterns can be used.

Next, the pattern navigation aiding device 12 uses the telescopic imaging system 26 with the telescope 28 to capture one or more images of a night sky, although other manners for capturing or otherwise obtaining celestial views may be used. In this example, the pattern navigation aiding device 12 also may also utilize the obtained data on where to expect the one or more beacon patterns that need to be identified for that current date, time and/or location to assist with positioning the telescope 28 to capture or otherwise obtains images of the night sky with the telescopic imaging system 26.

Next, the pattern navigation aiding device 12 executes image processing in the artificial celestial navigation module 32 to analyze the one or more captured images of the sky to search for the one or more beacon patterns that need to be identified, although other manners for searching for the beacon patterns may be used. The one or more beacon patterns that need to be identified may comprise only artificial stars generated by one or more of the pattern beacon devices 14(1)-14(n) as shown by way of example in FIG. 4 or may comprise a hybrid combination of one or more artificial stars and one or more real stars as shown by way of example in FIG. 5.

In this particular example for the image processing, the pattern navigation aiding device 12 executes a pattern matching algorithm in the artificial celestial navigation module 32 which uses pattern matching and a correlation filter to identify patterns of artificial and/or real stars in each of the captured images that match above a set threshold the previously shared beacon patterns that need to be identified. In other examples, to assist with the search and identification, the pattern navigation aiding device 12 may first identify a real star or stars that are in a hybrid beacon pattern to facilitate the identification process and then may identify the artificial stars based on the identification of the real star or stars.

In step 304, the pattern navigation aiding device 12 determines when the one or more beacon patterns that need to be identified in the one or more captured images in the sky have been found. If in step 304, the pattern navigation aiding device 12 determines any of the one or more beacon patterns that need to be identified in the one or more captured images in the sky have been not been found, then the No branch is taken to step 306.

In step 306, the pattern navigation aiding device 12 may rotate one or more of the captured images of the sky to assist with the search and identification. Next, the pattern navigation aiding device 12 again executes a pattern matching algorithm in the artificial celestial navigation module 32 which uses pattern matching and a correlation filter to identify patterns of artificial and/or real stars in each of the captured images that match above a set threshold any of the previously shared beacon patterns that need to be identified and were not found in step 304.

In step 308, the pattern navigation aiding device 12 determines when any of the one or more beacon patterns that needed to be identified in the one or more captured images in the sky and were not found in step 304, have now been found. If in step 308, the pattern navigation aiding device 12 determines any of the one or more beacon patterns that needed to be identified in the one or more captured images in the sky and were not found in step 304, have still not been found then the No branch is taken to step 310.

In step 310, the pattern navigation aiding device 12 may change angle of view to assist with the search and identification. Next, the pattern navigation aiding device 12 again executes a pattern matching algorithm in the artificial celestial navigation module 32 which uses pattern matching and a correlation filter to identify patterns of artificial and/or real stars in each of the captured images that match above a set threshold any of the previously shared beacon patterns that need to be identified and still were not found in step 308.

In step 312, the pattern navigation aiding device 12 determines when any of the one or more beacon patterns that still needed to be identified in the one or more captured images in the sky and were not found in step 310, have now been found. If in step 310, the pattern navigation aiding device 12 determines any of the one or more beacon patterns that still needed to be identified in the one or more captured images in the sky and were not found in step 310, have still not been found then the No branch is taken to step 314.

In step 314, the pattern navigation aiding device 12 determines a new section of the sky to search and then returns to step 302 as described earlier. In this example, the pattern navigation aiding device 12 determines a new section of the sky to search based on systematic adjustment based on the prior search area, although other approaches may be used, such as utilizing a real star which is in one of the beacon patterns to be identified as a focal point about which to adjust the search area by way of example.

If in steps 304, 308, or 312, the pattern navigation aiding device 12 the one or more beacon patterns that need to be identified in the one or more captured images in the sky have been found, then in each step the Yes branch is taken to step 316. In step 316, the pattern navigation aiding device 12 confirms that all of the one or more beacon patterns that need to be identified in the one or more captured images in the sky have been found.

In step 318, the pattern navigation aiding device 12 determines a heading to true north from the identified one or more beacon patterns in the one or more captured images of the sky, although other types of directional and/or other navigational information may be determined. The pattern navigation aiding device 12 may also identify and analyze multiple beacon patterns in the captured images and then take an average or other combined adjustment to determine heading to true north and/or or other navigational assistance information. The pattern navigation aiding device 12 can output this heading and/or other navigation assistance information, for example, to a display visible to a driver in a vehicle with the pattern navigation aiding device 12, although this output can be provided or used in other manners. By way of example, this output comprising a derived position and heading could be used to input to the inertial navigation system 29 as aiding data to assist in determination of heading and position when, for example, GPS/GNSS signal is denied or disrupted. The use of this output can advantageously improve the solution of the inertial navigation system 29 or provide other assistance, such as assisting in defining a confidence level of a determined position and/or heading by way of example.

In various examples of this technology, the pattern navigation aiding device 12 can advantageously utilize more than one beacon pattern to provide additional information to improve the estimate of heading to compensate for poor viewing conditions or angle of view relative to the observer for some of the identified beacon patterns. The pattern navigation aiding device 12 also can advantageously determine an estimated error in heading based on an amount of determined uncertainty in image matching in steps 302, 306, and/or 310 due to image noise, vibration or vehicle motion, rotational error, and/or viewing angle, although other types of error corrections may be incorporated. Additionally, in further examples of this technology, the beacon patterns that need to be identified may be implemented as a shared secret to the pattern navigation aiding device 12 so at given time and dates specific patterns indicate direction. This sharing of information can be accomplished by previously shared secrets or by using a distribution method to share before or during operation this information with the pattern navigation aiding device 12. By way of example, this is done typically using a private encrypted communication method over a wireless or wired network. Further, in other examples of this technology, the particular design of the beacon pattern shapes are specifically configured in a manner to have shapes, such as arrow shapes, intended to provide faster navigation information to the pattern navigation aiding device 12 as shown by the examples in FIGS. 4-6.

Accordingly, as illustrated and described by way of the examples herein, this technology provides a number of advantages including providing methods and systems for more dynamic navigational assistance with beacon patterns which have one or more artificial stars, such as current direction of travel or location of true north. Examples of this technology are able to provide additional navigation assistance to ground, sea, or air based vehicles then was previously possible with celestial navigation. Additionally, examples of this technology are able to compensate for atmospheric conditions which interference with traditional celestial navigation. Further, examples of this technology are able to provide navigational assistance information that aids an inertial navigation system in determining a heading and position when, for example, GPS/GNSS signal is denied or disrupted or in defining a confidence level of a determined position and/or heading by way of example.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   obtaining, by a computing device, one or more images of a section of sky;
   identifying, by the computing device, stars comprising at least one or more artificial stars in the one or more obtained images of the section of the sky that are in an image pattern that match above a set threshold at least one previously shared beacon pattern;
   determining, by the computing device, navigational information from the identified image pattern with the at least one or more artificial stars that matches above the set threshold the at least one previously shared beacon pattern; and
   outputting, by the computing device, the determined navigational information.

2. The method as set forth in claim 1 further comprising:
   rotating, by the computing device, the one or more obtained images of the section of the sky when the identifying is unable to match any of the stars with the at least one previously shared beacon pattern; and
   identifying, by the computing device, the stars comprising the at least one or more artificial stars in the one or more rotated images of the section of the sky that are in an image pattern that match above a set threshold at least one previously shared beacon pattern.

3. The method as set forth in claim 1 further comprising:
   adjusting, by the computing device, a viewing angle when the identifying is unable to match any of the stars with the at least one previously shared beacon pattern; and
   identifying, by the computing device, with the adjusted viewing angle the stars comprising the at least one or more artificial stars in the one or more obtained images of the section of the sky that are in an image pattern that match above a set threshold at least one previously shared beacon pattern.

4. The method as set forth in claim 1 further comprising:
   obtaining, by a computing device, one or more images of another section of sky when the identifying is unable to match any of the stars with the at least one previously shared beacon pattern;
   identifying, by the computing device, the stars comprising the at least one or more artificial stars in the one or more obtained images of the another section of the sky that are in an image pattern that match above a set threshold at least one previously shared beacon pattern.

5. The method as set forth in claim 1 wherein the identifying further comprises:
   identifying, by the computing device, the stars comprising the at least one or more artificial stars and one or more real stars in the one or more obtained images of the section of the sky that are in an image pattern that match above a set threshold at least one previously shared beacon pattern.

6. The method as set forth in claim 1 wherein the determined navigational information further comprises at least directional information or heading information.

7. A pattern navigation aiding device, comprising memory comprising programmed instructions stored thereon and one or more processors configured to be capable of executing the stored programmed instructions to:
   obtain one or more images of a section of sky;
   identify stars comprising at least one or more artificial stars in the one or more obtained images of the section of the sky that are in an image pattern that match above a set threshold at least one previously shared beacon pattern;
   determine navigational information from the identified image pattern with the at least one or more artificial stars that matches above the set threshold the at least one previously shared beacon pattern; and
   output the determined navigational information.

8. The device of claim 7, wherein the one or more processors are further configured to be capable of executing the stored programmed instructions to:
   rotate the one or more obtained images of the section of the sky when the identifying is unable to match any of the stars with the at least one previously shared beacon pattern; and
   identify the stars comprising the at least one or more artificial stars in the one or more rotated images of the section of the sky that are in an image pattern that match above a set threshold at least one previously shared beacon pattern.

9. The device of claim 7, wherein the one or more processors are further configured to be capable of executing the stored programmed instructions to:
   adjust a viewing angle when the identifying is unable to match any of the stars with the at least one previously shared beacon pattern; and
   identify with the adjusted viewing angle the stars comprising the at least one or more artificial stars in the one or more obtained images of the section of the sky that are in an image pattern that match above a set threshold at least one previously shared beacon pattern.

10. The device of claim 7, wherein the one or more processors are further configured to be capable of executing the stored programmed instructions to:
    obtain one or more images of another section of sky when the identifying is unable to match any of the stars with the at least one previously shared beacon pattern;
    identify the stars comprising the at least one or more artificial stars in the one or more obtained images of the another section of the sky that are in an image pattern that match above a set threshold at least one previously shared beacon pattern.

11. The device of claim 7, wherein for the identify, the one or more processors are further configured to be capable of executing the stored programmed instructions to:
    identify the stars comprising the at least one or more artificial stars and one or more real stars in the one or more obtained images of the section of the sky that are in an image pattern that match above a set threshold at least one previously shared beacon pattern.

12. The device as set forth in claim 7 wherein the determined navigational information further comprises at least directional information or heading information.

13. A non-transitory computer readable medium having stored thereon instructions comprising executable code which when executed by one or more processors, causes the one or more processors to:
    obtain one or more images of a section of sky;
    identify stars comprising at least one or more artificial stars in the one or more obtained images of the section of the sky that are in an image pattern that match above a set threshold at least one previously shared beacon pattern;
    determine navigational information from the identified image pattern with the at least one or more artificial stars that matches above the set threshold the at least one previously shared beacon pattern; and
    output the determined navigational information.

14. The non-transitory computer readable medium of claim 13, wherein the executable code when executed by the one or more processors further causes the one or more processors to:
- rotate the one or more obtained images of the section of the sky when the identifying is unable to match any of the stars with the at least one previously shared beacon pattern; and
- identify the stars comprising the at least one or more artificial stars in the one or more rotated images of the section of the sky that are in an image pattern that match above a set threshold at least one previously shared beacon pattern.

15. The non-transitory computer readable medium of claim 13, wherein the executable code when executed by the one or more processors further causes the one or more processors to:
- adjust a viewing angle when the identifying is unable to match any of the stars with the at least one previously shared beacon pattern; and
- identify with the adjusted viewing angle the stars comprising the at least one or more artificial stars in the one or more obtained images of the section of the sky that are in an image pattern that match above a set threshold at least one previously shared beacon pattern.

16. The non-transitory computer readable medium of claim 13, wherein the executable code when executed by the one or more processors further causes the one or more processors to:
- obtain one or more images of another section of sky when the identifying is unable to match any of the stars with the at least one previously shared beacon pattern;
- identify the stars comprising the at least one or more artificial stars in the one or more obtained images of the another section of the sky that are in an image pattern that match above a set threshold at least one previously shared beacon pattern.

17. The non-transitory computer readable medium of claim 13, wherein for the identify, the executable code when executed by the one or more processors further causes the one or more processors to:
- identify the stars comprising the at least one or more artificial stars and one or more real stars in the one or more obtained images of the section of the sky that are in an image pattern that match above a set threshold at least one previously shared beacon pattern.

18. The non-transitory computer readable medium as set forth in claim 13 wherein the determined navigational information further comprises at least directional information or heading information.

\* \* \* \* \*